Patented July 4, 1950

2,513,831

UNITED STATES PATENT OFFICE 2,513,831

PRODUCTION OF β-ACYLAMIDO-β-CARBALKOXY PIPERIDONES

Donald T. Warner and Owen A. Moe, Minneapolis, Minn., assignors to General Mills, Inc., a corporation of Delaware No Drawing. Application January 25, 1947, Serial No. 724,461

5 Claims. (Cl. 260—294)

The present invention relates to a process of preparing substituted piperidones, particularly the preparation of piperidones suitable for the synthesis of ornithine.

The piperidones contemplated by the present invention include those having the following structural formula:

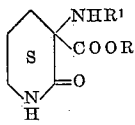

in which R is a low aliphatic group such as methyl, ethyl, propyl, butyl, and the like, and $R^1$ is a substituent which may be readily removed, for example by hydrolysis and/or hydrogenation, such as N acyl, N sulfonyl, and the like.

These compounds are particularly useful for the synthesis of ornithine. The preparation of ornithine from these piperidones may be accomplished by a simple hydrolysis and decarboxylation as is well understood.

According to the present invention, these piperidones may be prepared from aldehyde having the following formula:

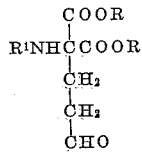

in which the two R groups may be alike or different and in which R and $R^1$ may be as above defined. These aldehydes may be prepared according to any of a number of methods disclosed in our copending application, Serial No. 648,020, filed February 15, 1946, and entitled Aldehydo Compounds and Processes of Producing the same.

The piperidones may be prepared from these aldehydes by converting the aldehyde to the phenylhydrazone and reducing phenylhydrazone to the piperidone in accordance with the following reactions:

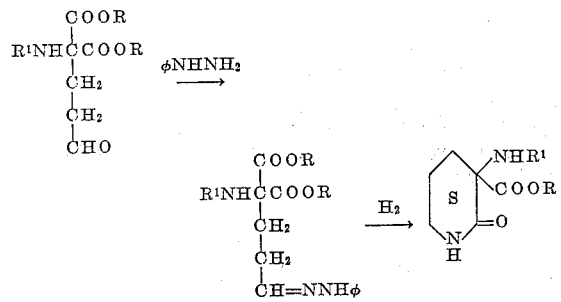

The preparation of the phenylhydrazone from the aldehyde may be accomplished by treating the aldehyde with phenylhydrazine and glacial acetic acid. The reaction mixture is warmed for a short time and then cooled and diluted with water to a slight turbidity. The reaction mixture is then allowed to stand in the cold until the resultant phenylhydrazone crystallizes out and is collected by filtration. The phenylhydrazone may be reduced to the piperidone by reduction in the presence of Raney nickel at 70–120° C. and 1500–2000 pounds hydrogen pressure. After a suitable reaction time, the catalyst may be removed by filtration and the piperidone crystallized from the reaction mixture by concentration of the alcohol solution and addition of ether.

The piperidone may be converted to ornithine by hydrolysis with concentrated hydrochloric acid. The reaction mixture is refluxed for an extended period of time and is then concentrated to a viscous residue. From this residue ornithine monohydrochloride may be obtained as a crystalline material. The monohydrochloride may be converted to the amino acid in accordance with known methods. The amino acid was characterized by preparing the dipicrate and dibenzoyl derivatives which melted at 197–198° C. with decomposition and at 184.5–185° C. respectively.

The following example will serve to illustrate the invention:

EXAMPLE

A. *Preparation of gamma,gamma-dicarbethoxy-gamma-acetamido butyraldehyde*

100 parts of absolute ethyl alcohol were treated with 0.05 part of metallic sodium. When the reaction of the sodium was complete, 43.7 parts of ethyl acetamidomalonate were added. The resultant reaction mixture was a thick slurry, and was cooled to 3° C. in an ice bath. Then 12.9 parts of acrolein were introduced dropwise. After the addition of approximately 4 parts of the acrolein, the reaction temperature had increased to 13° C. The introduction of the acrolein was interrupted, and the reaction temperature decreased to 8° C. The remainder of the acrolein was added at a rate such that the reaction temperature was maintained at 8–10° C. After the addition of the acrolein was complete, the reaction mixture was stirred for an additional 30-minute period. The solution was clear and light brown in color. During the addition of the acrolein, the solid initially present had disappeared. The clear, light-colored solution was cooled in an ice bath for an additional hour after which the catalyst was neutralized by the addition of 1.5 parts of glacial acetic acid dissolved in a small amount of ethanol. The pH of the reaction mixture at this point was between 4 and 6. The resulting mixture was placed in a refrigerator overnight. After standing overnight the solution was filtered and the solvent was removed by evaporation in vacuo. The residual oil was very clear and possessed a light yellow-brown color.

B. Preparation of the phenylhydrazone of gamma,gamma - dicarbethoxy - gamma - acetamido butyraldehyde An alcoholic solution consisting of 17.9 parts of the above aldehydo compound and approximately 100 parts of ethanol was mixed with 9.5 parts of phenylhydrazine and 1.5 parts of glacial acetic acid. The resulting reaction mixture was warmed for a few minutes on a water bath, then cooled and diluted with water to slight turbidity. The reaction mixture was allowed to stand in the refrigerator overnight and the resulting crystalline product was collected by filtration. The filtrate was again diluted with water to slight turbidity and, after standing overnight, the second crop of crystals was collected by filtration. The crystalline products were combined and washed with ethanol. The phenylhydrazone melted at 137–138.5° C.

C. Preparation of beta-acetamido-beta-carbethoxy piperidone

An alcoholic suspension consisting of 15.7 parts of the phenylhydrazone of gamma-acetamido-gamma,gamma-dicarbethoxy butyraldehyde and 90 parts of absolute ethanol was reduced in the presence of Raney nickel catalyst at 1760 pounds initial pressure. During the reduction the temperature was maintained at 70° C. for three hours, and for an additional hour at 100° C. The catalyst was removed by filtration and the filtrate was concentrated in vacuo to a syrup. Ether was added and the concentration in vacuo was repeated. The second addition of ether yielded a crystalline product which was collected by filtration, washed with ether and dried in vacuo. The beta-acetamido-beta-carbethoxy piperidone thus prepared melted at 136° to 137.5° C.

D. Preparation of ornithine 2.3 parts of beta-acetamido-beta-carbethoxy piperidone were mixed with 10 parts of concentrated hydrochloric acid. The reaction mixture was refluxed for a period of 4.5 hours. The resulting solution was then concentrated in vacuo to a viscous residue which was dissolved in 6 parts of ethanol. The alcoholic solution was treated with 1.4 parts of concentrated ammonium hydroxide. The immediate formation of a precipitate was noted, and after chilling for one hour, the precipitated product was collected by filtration. The collected product was suspended in absolute ethanol and the alcoholic suspension was boiled for approximately 10 minutes. The monohydrochloride of ornithine was finally collected, washed with absolute ethanol, and dried in vacuo. After purification it melted at 224–225° C. with decomposition. The monohydrochloride may be converted to the amino acid in accordance with known procedures. The dipicrate of ornithine was prepared in a conventional manner for identification purposes and was found to melt at 197–198° C. with decomposition. Ornithuric acid (dibenzoyl ornithine) was prepared and was found to melt at 184.5–185° C.

The above described process of preparing piperidones may be carried out in substantially the same manner where R and R¹ in the previously described formula are varied as there disclosed. Likewise the aldehydes having the various R and R¹ substituents may be prepared in essentially the same manner as that described for the preparation of gamma,gamma-dicarbethoxy-gamma-acetamido butyraldehyde.

While various modifications of the invention have been described, it is to be understood that the invention is not limited thereto, but may be varied within the scope of the following claims.

We claim as our invention:

1. Process of producing piperidones having the following structural formula:

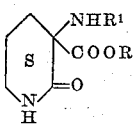

in which R is a low alkyl group and R¹ is an acyl group, from aldehydes having the following formula:

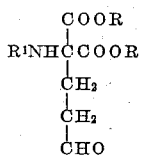

in which R and R¹ are as above defined, which comprises reacting the aldehyde with phenylhydrazine to form the phenylhydrazone of the aldehyde and reducing the phenylhydrazone to the piperidone.

2. Process of producing piperidones having the following structural formula:

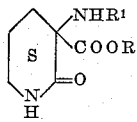

in which R is a low alkyl group and R¹ is an acyl group, from aldehydes having the following formula:

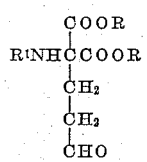

in which R and R¹ are as above defined, which comprises reacting the aldehyde with phenylhydrazine to form the phenylhydrazone of the aldehyde, subjecting the phenylhydrazone to catalytic hydrogenation at a pressure within the approximate range of 1500–2000 pounds, and at a temperature of 70–120° C. to produce the piperidone.

3. Process of producing piperidones having the following structural formula:

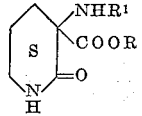

in which R is a low alkyl group and R¹ is a sulfonyl group, from aldehydes having the following formula:

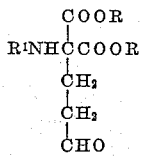

in which R and R¹ are as above defined, which comprises reacting the aldehyde with phenylhydrazine to form the phenylhydrazone of the aldehyde, subjecting the phenylhydrazone to catalytic hydrogenation at a pressure within the approximate range of 1500–2000 pounds, and at a temperature of 70–120° C. to produce the piperidone.

4. Process of producing piperidones having the following structural formula:

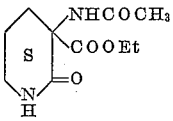

from aldehydes having the following formula:

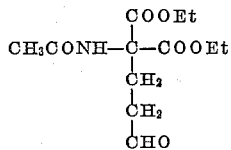

which comprises reacting the aldehyde with phenylhydrazine to form the phenylhydrazone of the aldehyde and reducing the phenylhydrazone to the piperidone.

5. Process of producing piperidones having the following structural formula:

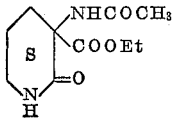

from aldehydes having the following formula:

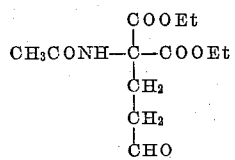

which comprises reacting the aldehyde with phenylhydrazine to form the phenylhydrazone of the aldehyde, subjecting the phenylhydrazone to catalytic hydrogenation at a pressure within the approximate range of 1500–2000 pounds, and at a temperature of 70–120° C. to produce the piperidone.

DONALD T. WARNER.
OWEN A. MOE.

REFERENCES CITED

The following references are of record in the file of this patent:

UNITED STATES PATENTS

| Number | Name | Date |
|---|---|---|
| 2,405,555 | Bergel et al. | Aug. 13, 1946 |

OTHER REFERENCES

Fischer: Berichte 42, pp. 4878–4886 (1909).
Bergmann et al., Zeit fur Physiol Chem., vol. 159 (1926), pp. 179–189.
Sidgwick, Organic Chemistry of Nitrogen (1942), pp. 16, 17, 393, 394, 395.
Albertson, J. Amer. Chem. Soc., vol. 67, pp. 2043, 2044 (1945).